(12) United States Patent
Chandrasekhar et al.

(10) Patent No.: US 10,824,486 B1
(45) Date of Patent: Nov. 3, 2020

(54) TWO-WAY CLIPBOARD EXCHANGE IN VIRTUAL CONSOLE

(71) Applicant: Dell Products L.P., Round Rock, TX (US)

(72) Inventors: Babu Chandrasekhar, Round Rock, TX (US); Rajib Saha, Bangalore (IN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/381,257

(22) Filed: Apr. 11, 2019

(51) Int. Cl.
*G06F 9/54* (2006.01)
*G06F 9/455* (2018.01)

(52) U.S. Cl.
CPC .......... *G06F 9/543* (2013.01); *G06F 9/45558* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 2008/0282180 A1* | 11/2008 | Glasgow | ................ | G06F 9/543 715/770 |
| 2009/0144368 A1* | 6/2009 | Andersen | ................ | G06F 9/543 709/205 |
| 2009/0146909 A1* | 6/2009 | Lection | ................ | G06F 1/1632 345/1.1 |
| 2009/0307689 A1* | 12/2009 | Sudhakar | ............ | G06F 9/45558 718/1 |
| 2012/0192176 A1* | 7/2012 | Shah | ...................... | G06F 9/452 718/1 |
| 2017/0078388 A1* | 3/2017 | Rajagopalan | ......... | G06F 16/182 |

* cited by examiner

*Primary Examiner* — Charles E Anya
(74) *Attorney, Agent, or Firm* — Jackson Walker L.L.P.

(57) ABSTRACT

An information handling system may include a host system including a host system processor and a host system memory coupled to the host system processor; and a management controller configured to provide out-of-band management of the host system. The management controller may be configured to establish a virtual console session between the host system and a remote terminal. The management controller may further be configured to, in response to a command from the remote terminal to send data from the remote terminal to the host system, mount a partition of the management controller such that the partition is accessible to the host system, wherein the partition includes the data. The management controller may be further configured to transmit a notification to the host system indicating the command and the partition, wherein the host system is configured to receive the data from the partition in accordance with the command.

20 Claims, 3 Drawing Sheets

TWO-WAY CLIPBOARD EXCHANGE IN VIRTUAL CONSOLE

TECHNICAL FIELD

The present disclosure relates in general to information handling systems, and more particularly to systems and methods for exchanging information (e.g., clipboard information) in a virtual console environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As described in further detail below, management controllers may be used to provide management facilities for information handling systems. In particular, a management controller may provide management facilities to allow a user/administrator to control a host system of an information handling system via a virtual console interface.

It may be advantageous for such a user to be able to exchange clipboard data (e.g., by cutting, copying, and pasting data) as well as other data (e.g., by transferring files) with the host system that is under management. Although some existing management solutions such as Virtual Network Computing (VNC) may allow for clipboard data exchange in some circumstances, such existing systems must generally be run on the host system itself to allow for such exchange. For a virtual console that is enabled via a management controller of a host system, rather than the host system itself, existing solutions have thus far been lacking.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with remote management of information handling systems may be reduced or eliminated.

In accordance with embodiments of the present disclosure, an information handling system may include a host system including a host system processor and a host system memory coupled to the host system processor; and a management controller configured to provide out-of-band management of the host system. The management controller may be configured to establish a virtual console session between the host system and a remote terminal. The management controller may further be configured to, in response to a command from the remote terminal to send data from the remote terminal to the host system, mount a partition of the management controller such that the partition is accessible to the host system, wherein the partition includes the data. The management controller may be further configured to transmit a notification to the host system indicating the command and the partition, wherein the host system is configured to receive the data from the partition in accordance with the command.

In accordance with these and other embodiments of the present disclosure, a method may include a management controller that is configured to provide out-of-band management of a host system of an information handling system establishing a virtual console session between the host system and a remote terminal. The method may further include, in response to a command from the remote terminal to send data from the remote terminal to the host system, the management controller mounting a partition of the management controller such that the partition is accessible to the host system, wherein the partition includes the data. The method may yet further include the management controller transmitting a notification to the host system indicating the command and the partition, wherein the host system is configured to receive the data from the partition in accordance with the command.

In accordance with these and other embodiments of the present disclosure, an article of manufacture may include a non-transitory, computer-readable medium having instructions thereon that are executable by a processor of a management controller of an information handling system for: establishing a virtual console session between a host system of the information handling system and a remote terminal; in response to a command from the remote terminal to send data from the remote terminal to the host system, mounting a partition of the management controller such that the partition is accessible to the host system, wherein the partition includes the data; and transmitting a notification to the host system indicating the command and the partition, wherein the host system is configured to receive the data from the partition in accordance with the command.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
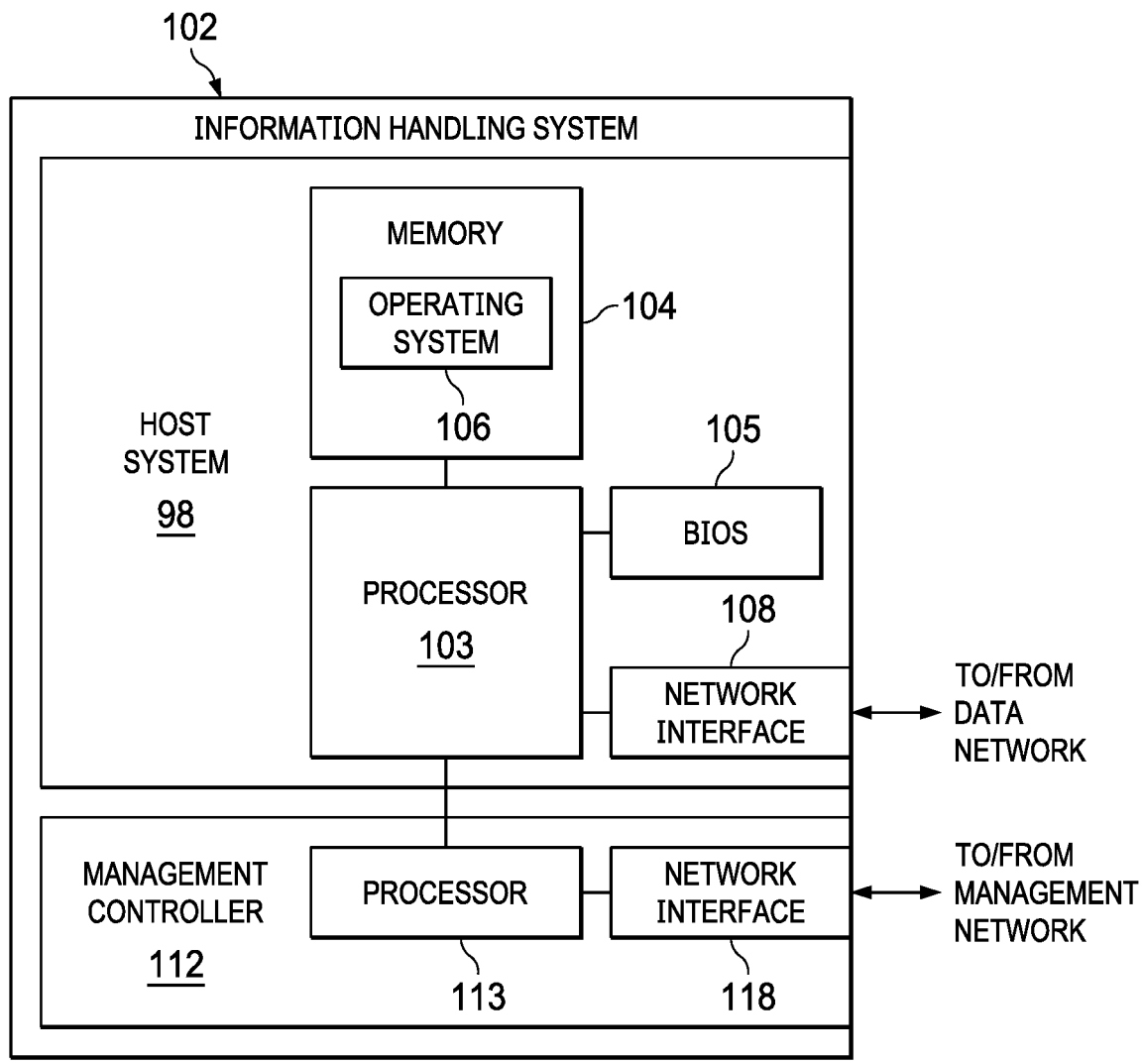
FIG. 1 illustrates a block diagram of an example information handling system, in accordance with embodiments of the present disclosure.
Figure 2:
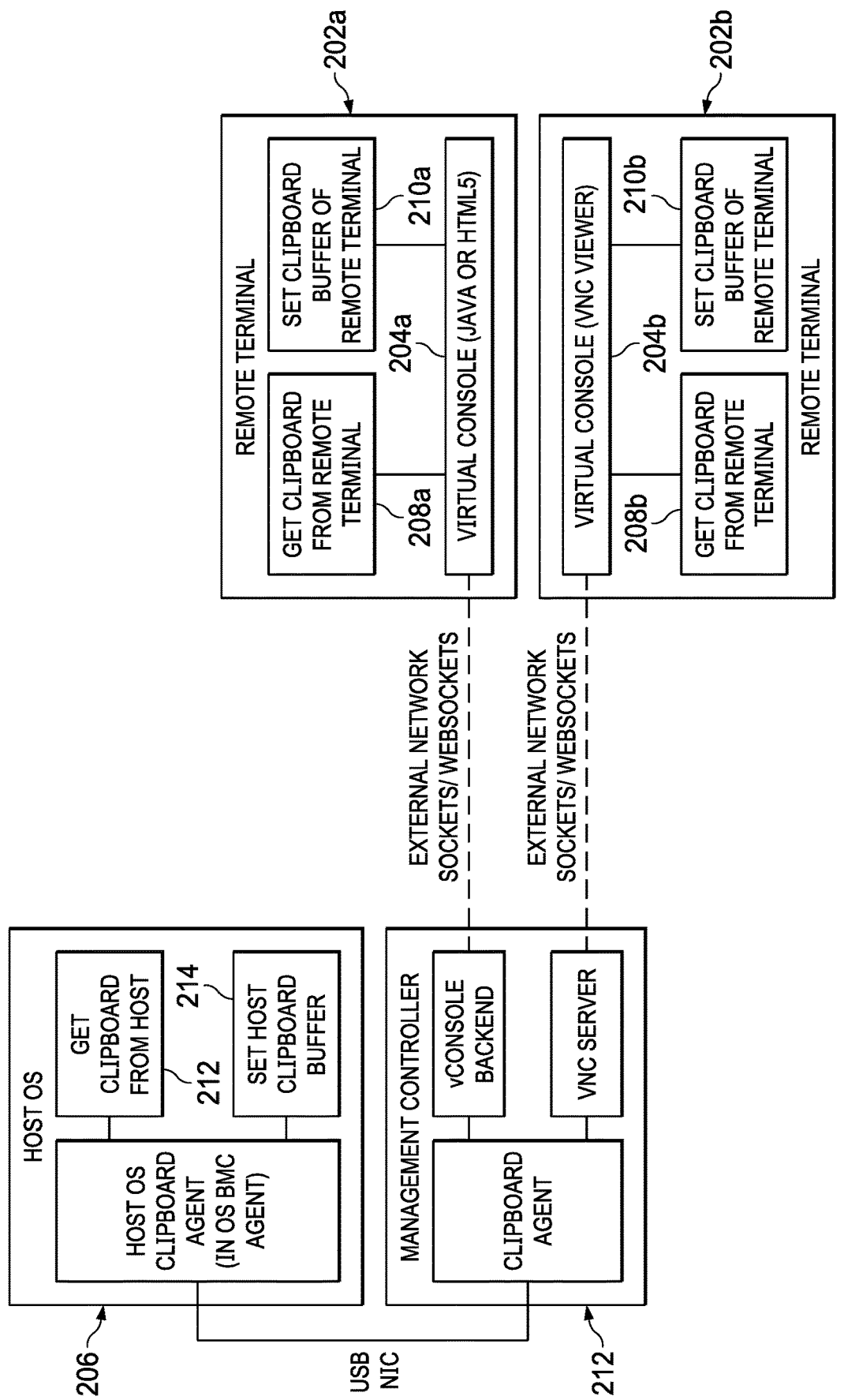
FIG. 2 illustrates a block diagram of example information handling systems, in accordance with embodiments of the present disclosure.
Figure 3:
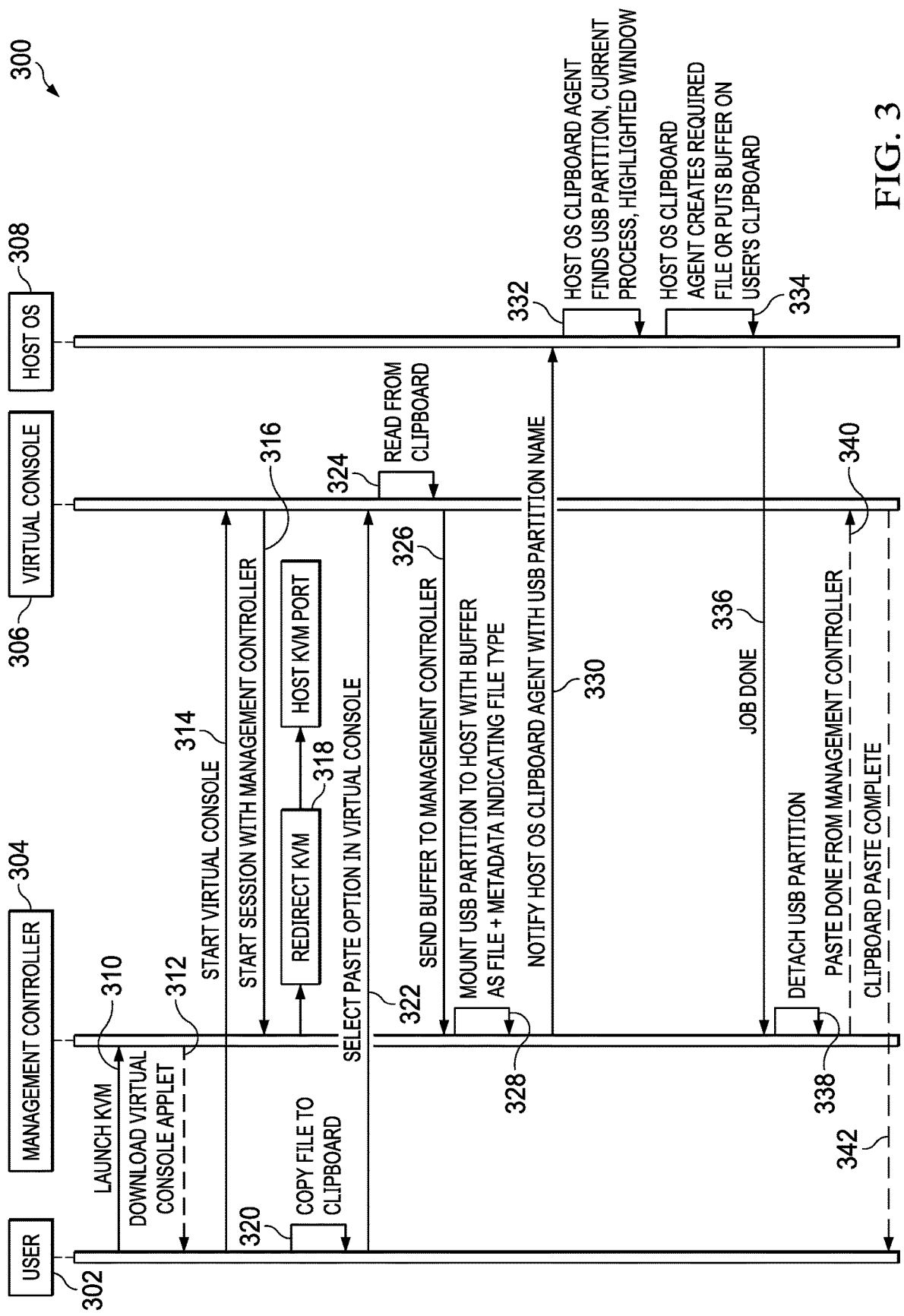
FIG. 3 illustrates an example flow diagram, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

For the purposes of this disclosure, the term "remote terminal" may be used to refer broadly to an information handling system that is configured to couple to a management controller and issue management instructions for an information handling system (e.g., a host system) that is being managed by the management controller. In various embodiments, remote terminals may be implemented via specialized hardware and/or via software running on a standard information handling system.

For the purposes of this disclosure, the term "virtual console" may be used to refer broadly to any program of executable instructions (or aggregation of programs of executable instructions) configured to allow a remote terminal to couple to a management controller of a host system and provide management of that host system. For example, a virtual console may enable remote access to a serial console of the host system via the management controller.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As noted above, management controller 112 may be used to provide remote management access to host system 98 (e.g., via access to operating system 106). FIG. 2 illustrates an embodiment in which virtual consoles 204a and 204b execute on remote terminals 202a and 202b, respectively.

(These components are sometimes referred to herein collectively as virtual consoles 204 and remote terminals 202.)

Virtual consoles 204 provide access to a host system (e.g., host operating system 206) via management controller 212. In some embodiments, management controller 212 may comprise an iDRAC. As one of ordinary skill in the art with the benefit of this disclosure will readily understand, various other types of management controller may also be used in particular implementations.

As shown, management controller 212 includes as a component thereof a clipboard agent. The management controller clipboard agent may include any program of executable instructions (or aggregation of programs of executable instructions) configured to manage clipboard operations, as discussed in further detail below.

Management controller 212 further includes both a vConsole backend and a VNC server, which may interface with the management controller clipboard agent through the use of inter-process communication (IPC). Virtual console 204a provides a Java or HTML5 interface (e.g., through the use of a web browser) to management controller 212 via its vConsole backend, and virtual console 204b provides a VNC interface to management controller 212 via its VNC server. In some embodiments, other types of virtual console (e.g., ActiveX, etc.) may also be enabled.

As will be understood by one of ordinary skill in the art with the benefit of this disclosure, management controller 212 may be exposed to host operating system 206 (in whole or in part) via a USB NIC. Host operating system 206 may have executing thereon an OS BMC agent (e.g., an iDRAC service module (iSM) in embodiments in which management controller 212 comprises an iDRAC) for interfacing with management controller 212 via such USB NIC.

As discussed in further detail with regard to FIG. 3, virtual consoles 204a and 204b may interact with clipboard functionality of the respective remote terminals 202. For example, functions 208a and 208b may be operable to get the clipboard data from the respective remote terminal 202. Likewise, functions 210a and 210b may be operable to set the clipboard buffer of the respective remote terminal 202.

In this embodiment, a host operating system clipboard agent may execute on host operating system 206. The host operating system clipboard agent may include any program of executable instructions (or aggregation of programs of executable instructions) configured to manage clipboard operations on the host system, as discussed in further detail below.

For example, such a host system clipboard agent may execute as a component of an OS BMC agent. This clipboard agent may provide functions for interacting with the clipboard of the host information handling system. For example, function 212 may be operable to get the clipboard data from host operating system 206. Likewise, function 214 may be operable to set the clipboard buffer of host operating system 206.

As discussed in further detail below, these various clipboard functions that are respectively implemented at host operating system 206 and virtual consoles 204a and 204b may be combined to allow seamless two-way clipboard functionality.

FIG. 3 illustrates a flow chart of an example method 300 for clipboard exchange in accordance with embodiments of the present disclosure. As shown in FIG. 3, user 302 may use virtual console 306 (which may execute on a remote terminal) to interact with management controller 304 to manage host operating system 308. In some embodiments, user 302 may use a keyboard-video-mouse (KVM) over IP connection for such interactions. In this example, user 302 desires to copy local data at the remote terminal and paste that data to the host system that is under management.

According to certain embodiments, method 300 may begin at step 310. As noted above, teachings of the present disclosure may be implemented in a variety of configurations of information handling system 102. As such, the preferred initialization point for method 300 and the order of the steps comprising method 300 may depend on the implementation chosen. In these and other embodiments, method 300 may be implemented as hardware, firmware, software, applications, functions, libraries, or other instructions.

At step 310, user 302 establishes a KVM connection to management controller 304. For example, this connection may be implemented as a KVM over IP connection. In some embodiments, all of the interactions described below with respect to virtual console 306 may take place over this KVM over IP connection, with no additional connections being needed.

At step 312, if necessary, user 302 downloads a virtual console applet from management controller 304. For example, user 302 may download a Java or HTML5 virtual console applet (or application) for execution on the user's remote terminal. In other embodiments, a VNC viewer/VNC server arrangement may be used. In yet other embodiments, user 302 may already have the necessary applet/application installed.

At steps 314 and 316, user 302 starts the virtual console 306 and uses it to establish a session with management controller 316. At step 318, management controller 304 may then redirect communications as necessary between virtual console 306 and a KVM port of the host system. This may enable user 302 to access a serial terminal/tty of host operating system 308.

At step 320, user 302 copies a file to the local clipboard of the remote terminal. In various embodiments, any suitable type of data may be copied (or cut) to the local clipboard. For example, a file, a string of plain text, image data, audio data, multimedia data, or any other data stream may be placed in the local clipboard.

At step 322, user 302 selects the paste option within the management session of virtual console 306. In response, virtual console 306 reads from the local clipboard at step 324.

At step 326, virtual console 306 sends a buffer containing the clipboard data to management controller 304. In various embodiments, any suitable data structure may be used to encapsulate the clipboard data for transmission.

At step 328, management controller 304 creates a mass storage partition (e.g., a USB partition) containing the clipboard data and mounts the partition so that it is accessible to host operating system 308. Management controller 304 may also include metadata indicating the file type of the clipboard data at this step.

At step 330, management controller 304 transmits a notification to host operating system 308 indicating the name of the mounted USB partition. For example, this notification may be transmitted to a host operating system clipboard agent executing under host operating system 308.

At step 332, the host operating system clipboard agent locates the USB partition, determines the current process ID (e.g., of a tty process in use by user 302), and determines the path of the highlighted window in use by user 302. The process ID and highlighted window path may be used at step 334 below when determining how and where to dispatch the clipboard data.

At step 334, the host operating system clipboard agent dispatches the clipboard data as necessary. For example, in the case of a file transfer, the requested file may be created. In the case of a clipboard paste operation, the clipboard data may be placed into the clipboard buffer of a tty process in use by user 302. In some embodiments, a paste command may also be transmitted via the host operating system clipboard agent, so that the data placed into the clipboard buffer of the tty process is automatically pasted (e.g., at the current cursor location).

At step 336, the host operating system clipboard agent notifies management controller 304 that it has completed the transfer.

At step 338, in response, management controller 304 detaches/unmounts the USB partition. In various embodiments, the USB partition may be completely destructed, or it may remain for purposes of future clipboard operations or the like.

At step 340, management controller 304 notifies virtual console 306 that it has completed the transfer.

At step 342, virtual console 306 notifies user 302 that it has completed the transfer, and method 300 ends.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using any of the various components disclosed herein (such as the components of FIG. 1), and/or any other system operable to implement method 300. In certain embodiments, method 300 may be implemented partially or fully in software and/or firmware embodied in computer-readable media.

It should be noted that while method 300 describes in detail a process for allowing a user to copy data locally and paste that data into the host operating system under management, a similar process may be used to accomplish the reverse.

For example, the host operating system clipboard agent may receive a command to copy data from host operating system 308. The host operating system clipboard agent may then create a USB partition (or instruct management controller 304 to create such a USB partition) that is accessible to both host operating system 308 and management controller 304. The host operating system clipboard agent may then transmit a buffer including the copied data to such a USB partition. Finally, management controller 304 may then coordinate with virtual console 306 to allow user 302 to receive that data locally at the remote terminal.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
    a host system including a host system processor and a host system memory coupled to the host system processor; and a management controller including a management processor configured to provide out-of-band management of the host system, wherein the management controller is configured to:
    establish a virtual console session between the management controller of the host system and a remote terminal; and
    in response to a command from a user of the remote terminal to send clipboard data from the remote terminal to the host system:
        store the clipboard data on a partition of a storage device of the management controller that is local to the management controller;
        mount the partition such that the partition is accessible to the host system;
        transmit a notification to a clipboard agent of the host system indicating the command and the partition, wherein the host system is configured to receive the clipboard data from the partition in accordance with the command, and wherein the clipboard agent is configured to determine a current process identifier and a window in use by the user, and further configured to dispatch the clipboard data in accordance with the current process identifier and the window; and
        notify the virtual console of a completion of the dispatch of the clipboard data.

2. The information handling system of claim 1, wherein the command includes a clipboard paste command, and wherein the host system is configured to set a host system clipboard buffer associated with the virtual console session to include the data.

3. The information handling system of claim 1, wherein the partition is further usable to transfer second data from the host system to the remote terminal.

4. The information handling system of claim 1, wherein the command includes a file transfer command.

5. The information handling system of claim 1, wherein the partition is a Universal Serial Bus (USB) partition.

6. The information handling system of claim 1, wherein the data is text data.

7. The information handling system of claim 1, wherein the command includes a clipboard paste command, and wherein the data is multimedia data.

8. The information handling system of claim 1, wherein the management controller is further configured to unmount the partition after the host system has received the data from the partition in accordance with the command.

9. A method comprising:
    a management controller including a management processor that is configured to provide out-of-band management of a host system of an information handling system establishing a virtual console session between the management controller and a remote terminal; and
    in response to a command from a user of the remote terminal to send clipboard data from the remote terminal to the host system:
        storing the clipboard data on a partition of a storage device of the management controller that is local to the management controller;
        mounting the partition such that the partition is accessible to the host system;
        transmitting a notification to a clipboard agent of the host system indicating the command and the partition, wherein the host system is configured to receive the clipboard data from the partition in accordance with the command, and wherein the clipboard agent is configured to determine a current process identifier and a window in use by the user, and further configured to dispatch the clipboard data in accordance with the current process identifier and the window; and
        notifying the virtual console of a completion of the dispatch of the clipboard data.

10. The method of claim 9, further comprising the management controller receiving a command from the remote terminal to send second data from the host system to the remote terminal.

11. The method of claim 10, further comprising the management controller transferring the second data from the host system to the partition.

12. The method of claim 11, further comprising the management controller transferring the second data from the partition to the remote terminal.

13. An article of manufacture comprising a non-transitory, computer-readable medium having computer-executable code thereon that is executable by a processor of a management controller of a host system of an information handling system for:
    establishing a virtual console session between the management controller and a remote terminal; and
    in response to a command from a user of the remote terminal to send clipboard data from the remote terminal to the host system:
        storing the clipboard data on a partition of a storage device of the management controller that is local to the management controller;
        mounting the partition such that the partition is accessible to the host system;
        transmitting a notification to a clipboard agent of the host system indicating the command and the partition, wherein the host system is configured to receive the clipboard data from the partition in accordance with the command, and wherein the clipboard agent is configured to determine a current process identifier and a window in use by the user, and further configured to dispatch the clipboard data in accordance with the current process identifier and the window; and notifying the virtual console of a completion of the dispatch of the clipboard data.

14. The article of claim 13, wherein the command includes a clipboard paste command, and wherein the host system is configured to set a host system clipboard buffer associated with the virtual console session to include the data.

15. The article of claim 13, wherein the partition is further usable to transfer second data from the host system to the remote terminal.

16. The article of claim 13, wherein the command includes a file transfer command.

17. The article of claim 13, wherein the partition is a partition of a physical storage resource integral to the management controller, and wherein the mounting is made via a Universal Serial Bus (USB) interface of the host system.

18. The article of claim 13, wherein the data is text data.

19. The article of claim 13, wherein the command includes a clipboard paste command, and wherein the data is multimedia data.

20. The article of claim 13, wherein the management controller is further configured to unmount the partition after the host system has received the data from the partition in accordance with the command.

* * * * *